US012574249B2

(12) United States Patent
DeLuca et al.

(10) Patent No.: US 12,574,249 B2
(45) Date of Patent: Mar. 10, 2026

(54) OFF-CHAIN DOMAIN NAME RECORD RESOLUTION BASED ON BLOCKCHAIN ASSETS

(71) Applicant: Unstoppable Domains, Inc., Las Vegas, NV (US)

(72) Inventors: Lisa Seacat DeLuca, Bozeman, MT (US); Matthew Gould, Atlanta, GA (US)

(73) Assignee: Unstoppable Domains, Inc., Las Vegas, NV (US)

( * ) Notice: Subject to any disclaimer, the term of this patent is extended or adjusted under 35 U.S.C. 154(b) by 180 days.

(21) Appl. No.: 18/511,472

(22) Filed: Nov. 16, 2023

(65) Prior Publication Data

US 2025/0168011 A1      May 22, 2025

(51) Int. Cl.
*H04L 9/32* (2006.01)
*H04L 9/00* (2022.01)
*H04L 61/4511* (2022.01)
*H04L 67/02* (2022.01)

(52) U.S. Cl.
CPC .............. *H04L 9/3247* (2013.01); *H04L 9/50* (2022.05); *H04L 61/4511* (2022.05); *H04L 67/02* (2013.01); *H04L 2209/56* (2013.01)

(58) Field of Classification Search
None
See application file for complete search history.

(56) References Cited

U.S. PATENT DOCUMENTS

| | | | |
|---|---|---|---|
| 1,227,800 A | 5/1917 | Kent | |
| 9,553,981 B2 | 1/2017 | Czarnecki et al. | |
| 10,846,762 B1 | 11/2020 | Dennis et al. | |
| 11,334,560 B2 * | 5/2022 | Yan | H04L 9/0637 |
| 11,558,334 B2 | 1/2023 | Gupta et al. | |
| 11,558,344 B1 | 1/2023 | Pezeshki et al. | |
| 11,621,829 B2 * | 4/2023 | Kaizer | H04L 9/3239 |
| | | | 713/171 |

(Continued)

FOREIGN PATENT DOCUMENTS

| | | |
|---|---|---|
| CN | 1984185 A | 6/2007 |
| WO | 2020/010023 A1 | 1/2020 |

OTHER PUBLICATIONS

"Introducing Blend: the Peer-to-Peer Perpetual Lending Protocol for NFT's", https://x.com/blur_io/status/1653051809240604674?s=20, downloaded from the internet Jun. 26, 2024, 2 pages.

(Continued)

*Primary Examiner* — Lashonda Jacobs-Burton
(74) *Attorney, Agent, or Firm* — Edell, Shapiro & Finnan, LLC

(57) ABSTRACT

According to a present invention embodiment, a system for managing domain information for an off-chain domain comprises one or more memories and at least one processor coupled to the one or more memories. The system associates the domain information for the off-chain domain with a blockchain asset. The domain information is retrieved from a blockchain based on the blockchain asset. Embodiments of the present invention further include a method and computer program product for managing domain information for an off-chain domain in substantially the same manner described above.

21 Claims, 8 Drawing Sheets

(56) References Cited

U.S. PATENT DOCUMENTS

| | | | | |
|---|---|---|---|---|
| 11,632,236 | B1 * | 4/2023 | Kaizer | H04L 61/4511 |
| | | | | 713/173 |
| 11,750,570 | B1 | 9/2023 | Eby et al. | |
| 11,876,774 | B2 | 1/2024 | Pezeshki et al. | |
| 11,985,252 | B1 | 5/2024 | Pezeshki et al. | |
| 12,147,978 | B2 * | 11/2024 | Gauvreau, Jr. | G06Q 20/389 |
| 12,425,228 | B1 * | 9/2025 | Kaizer | H04L 9/50 |
| 2015/0356523 | A1 | 12/2015 | Madden | |
| 2016/0217436 | A1 | 7/2016 | Brama | |
| 2016/0330027 | A1 | 11/2016 | Ebrahimi | |
| 2019/0096021 | A1 | 3/2019 | Jarvis et al. | |
| 2020/0406859 | A1 | 12/2020 | Hassani | |
| 2020/0409942 | A1 * | 12/2020 | Kasimov | H04L 63/10 |
| 2021/0058353 | A1 | 2/2021 | Creech et al. | |
| 2022/0198049 | A1 | 6/2022 | Dumas et al. | |
| 2022/0198444 | A1 | 6/2022 | Mee et al. | |
| 2023/0171225 | A1 | 6/2023 | Pezeshki et al. | |
| 2023/0418979 | A1 | 12/2023 | DeLuca et al. | |
| 2023/0421399 | A1 | 12/2023 | Quirk et al. | |
| 2024/0056525 | A1 | 2/2024 | DeLuca | |
| 2024/0095733 | A1 * | 3/2024 | Gauvreau, Jr. | G06Q 20/3672 |
| 2024/0146523 | A1 | 5/2024 | DeLuca et al. | |
| 2024/0154805 | A1 * | 5/2024 | Choi | H04L 9/50 |
| 2024/0163095 | A1 * | 5/2024 | Singh | H04L 9/14 |
| 2024/0275609 | A1 | 8/2024 | Pezeshki et al. | |
| 2024/0305489 | A1 * | 9/2024 | Kasimov | G06Q 30/06 |
| 2024/0372827 | A1 * | 11/2024 | Hsu | H04L 61/3025 |
| 2025/0225124 | A1 | 7/2025 | Pezeshki et al. | |
| 2025/0254143 | A1 | 8/2025 | Pezeshki et al. | |

OTHER PUBLICATIONS

Owen Fernau, "Blur Launches NFT Lending Protocol", The Defiant, https://thedefiant.io/news/nfts-and-web3/blur-nft-lending, May 2, 2023, 7 pages.

International Search Report and Written Opinion in International Application No. PCT/US23/71399, dated Nov. 16, 2023, 10 pages.

Jeff Benson, "You Can Now Use Your .com Domain to Send and Receive Ethereum", https://decrypt.co/79517/you-can-now-use-your-com-domain-send-receive-ethereum Decrypt, Aug. 26, 2021, 8 pages.

"Claim your DNS name onchain in ENS", ENS, https://support. ens.domains/en/articles/7882690-claim-your-dns-name, downloaded from the internet on Feb. 9, 2024, 10 pages.

"Ethereum Name Service (ENS)", https://etherscan.io/token/0xc18 360217d8f7ab5e7c516566761ea12ce7f9d72#readContract, downloaded from the internet on Feb. 9, 2024, 4 pages.

"Ethereum Name Service (ENS)", https://etherscan.io/token/0xc18 360217d8f7ab5e7c516566761ea12ce7f9d72#writeContract, downloaded from the internet on Feb. 9, 2024, 2 pages.

"Unstoppable Domains (UD)", https://polygonscan.com/token/0xa9a 6a3626993d487d2dbda3173cf58ca1a9d9e9f#readProxyContract, downloaded from the internet on Feb. 9, 2024, 3 pages.

"Unstoppable Domains (UD)", https://polygonscan.com/token/0xa9a 6a3626993d487d2dbda3173cf58ca1a9d9e9f#writeProxyContract, downloaded from the internet on Feb. 9, 2024, 3 pages.

"Why Are Some Domains Protected?", Unstoppable Domains, Mar. 11, 2022, https://support.unstoppabledomains.com/support/solutions/articles/48001186091-why-are-some-domains-protected, 3 pages.

Wikipedia, "Blockchain", https://en.wikipedia.org/wiki/Blockchain, downloaded from the internet on Mar. 25, 2022, 27 pages.

"How does a transaction get into the blockchain?", Euromoney Learning, https://www.euromoney.com/learning/blockchain-explained/how-transactions-get-into-the-blockchain, downloaded from the internet on Mar. 25, 2022, 9 pages.

Benjamin Powers, "Brave Integrates Crypto Blockchain Domains, Expanding Access to Web 3.0—CoinDesk", https://www.coindesk.com/tech/2021/05/13/brave-integrates-crypto-blockchain-domains-expanding-access-to-web-30/, May 13, 2021, 10 pages.

"What is a non-fungible token (NFT)?", https://www.coinbase.com/learn/crypto-basics/plp-what-is-nft, downloaded from the internet on Mar. 25, 2022, 10 pages.

Michele D'Aliessi, "How Does the Blockchain Work? A Guide to Everything You Need to Know", OneZero, https://onezero.medium.com/how-does-the-blockchain-work-98c8cd01d2ae, Jun. 1, 2016, 21 pages.

James Beck, Blog, "Mirror.xyz Review: How To Use MetaMask To Compete In The $WRITE Race", Jul. 30, 2021, https://consensys.net/blog/metamask/mirror-xyz-review-how-to-use-metamask-to-compete-in-the-write-race, 14 pages.

Amaury Martiny, "One-click Login with Blockchain: A MetaMask Tutorial", https://www.toptal.com/ethereum/one-click-login-flows-a-metamask-tutorial, downloaded from the internet on Mar. 25, 2022, 16 pages.

"Unstoppable Domains launches Login with Unstoppable", https://unstoppabledomains.com/blog/introducing-login-with-unstoppable, Jan. 9, 2022, 7 pages.

"ERC: Claim Holder—Issue #735", https://github.com/ethereum/eips/issues/735, GitHub, ethereum/EIPs, downloaded from the internet on Oct. 14, 2022, 21 pages.

"LIPs/LSPs/LSP-6-KeyManager.md", GitHub, lukso-network/LIPS, https://github.com/lukso-network/LIPs/blob/main/LSPs/LSP-6-KeyManager.md, downloaded from the internet on Oct. 14, 2022, 13 pages.

"Allowlists, denylists, and approved senders", Google Workspace Admin Help, https://support.google.com/a/answer/60752?hl=en#:~: text=Email allowlist—A list of, allowlist the contact's IP address 1, downloaded from the internet on Oct. 31, 2022, 1 page.

"S/MIME Digital Signatures", GlobalCerts, https://globalcerts.com/smime-digital-signatures, downloaded from the internet on Oct. 31, 2022, 5 pages.

Blog, "Introducing Humanity Check—100% Opt-In", Unstoppable Domains, https://unstoppabledomains.com/blog/introducing-humanity-check, Mar. 13, 2022, downloaded from the internet on Mar. 25, 2022, 8 pages.

Antoni Zolciak, "Beyond KYC: Stricter Privacy Policies are Looming, But DeFi is Here to Stay", https://www.nasdaq.com/articles/beyond-kyc%3A-stricter-privacy-policies-are-looming-but-defi-is-here-to-stay, Dec. 8, 2021, 7 pages.

"Humanity Check Overview", https://docs.unstoppabledomains.com/login-with-unstoppable/humanity-check/humanity-check-for-login/, downloaded from the internet on Apr. 7, 2022, 5 pages.

"Progressive risk segmentation: your secret to balancing fraud prevention and conversion", https://withpersona.com, downloaded from the internet on Apr. 1, 2022, 7 pages.

Jennifer Lowe, "What is KYC and why does it matter?", Plaid.com, Aug. 12, 2021, 15 pages.

Alex Gomez, "Unstoppable Domains Email (What Is it and How Does it Work?)", Cyber Scrilla, https://cyberscrilla.com/unstoppable-domains-email/#:~: text=How, Sep. 1, 2022, 43 pages.

Adriel Estrada, "Introducing Unstoppable Email with Skiff", Unstoppable Domains, https://unstoppabledomains.com/blog/categories/announcements/article/unstoppable-email-skiff, Aug. 30, 2022, 7 pages.

International Search Report and Written Opinion in International Application No. PCT/US23/68858, dated Oct. 19, 2023, 8 pages.

"DNS records for unstoppabledomains.com", Unstoppable Domains, https://www.nslookup.io/domains/unstoppabledomains.com/dns-records/, downloaded from the internet on Nov. 16, 2023, 5 pages.

* cited by examiner

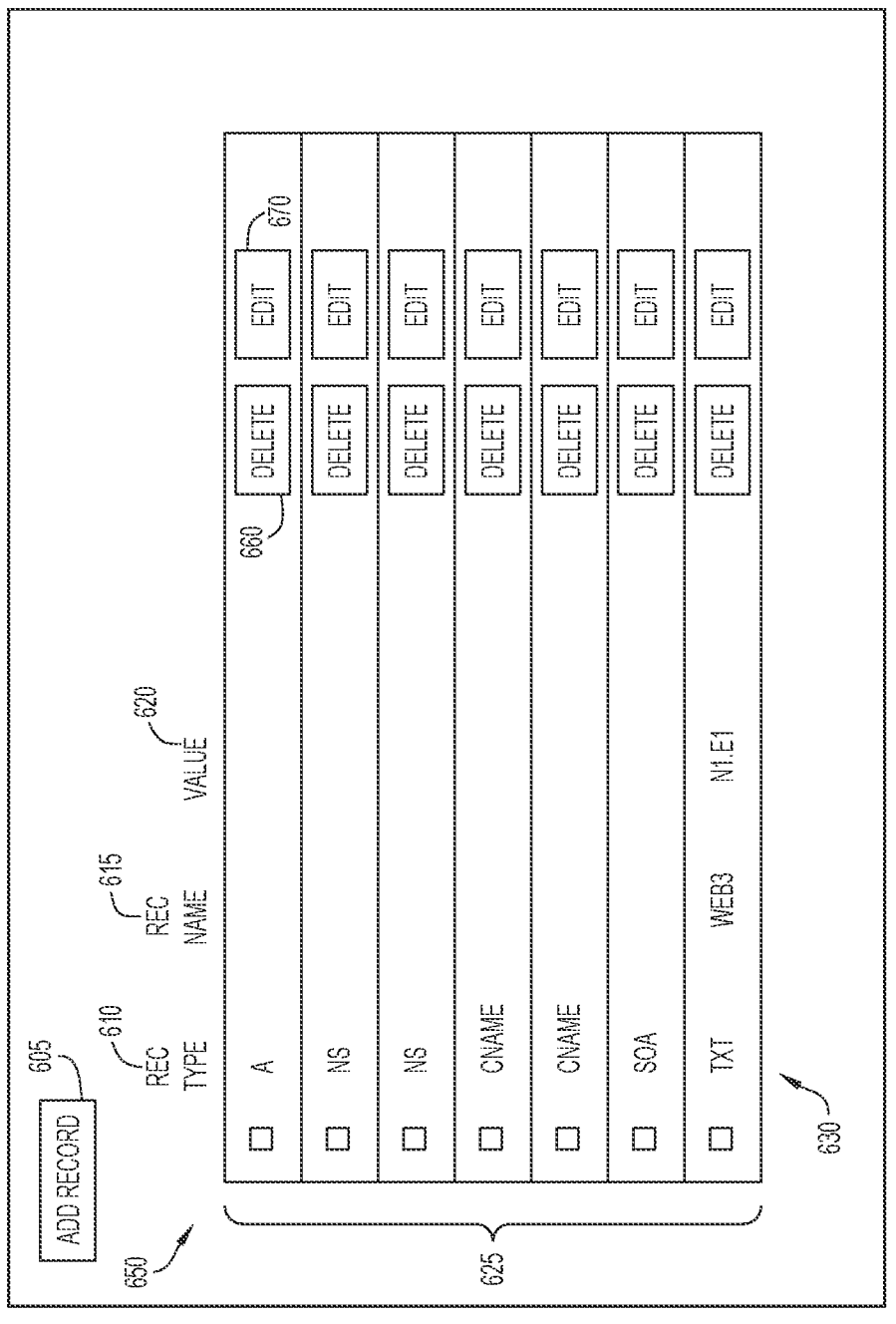
| | REC TYPE 610 | REC NAME 615 | VALUE 620 | 660 | 670 |
|---|---|---|---|---|---|
| ☐ | A | | | DELETE | EDIT |
| ☐ | NS | | | DELETE | EDIT |
| ☐ | NS | | | DELETE | EDIT |
| ☐ | CNAME | | | DELETE | EDIT |
| ☐ | CNAME | | | DELETE | EDIT |
| ☐ | SOA | | | DELETE | EDIT |
| ☐ | TXT | WEB3 | N1.E1 | DELETE | EDIT |
ADD RECORD 605
650
625
630
FIG. 6
600

OFF-CHAIN DOMAIN NAME RECORD RESOLUTION BASED ON BLOCKCHAIN ASSETS

TECHNICAL FIELD

Present invention embodiments relate to network domain access and security, and more specifically, to associating Domain Name Server (DNS) records for a Web2 domain with a blockchain asset and restricting modification of the DNS records to an authorized user that can sign with their blockchain public key. A blockchain asset may include any digital asset or item that identifies, is associated with, or includes objects stored on a blockchain, such as a set of records, an object that points to a set of records, non-fungible token (NFT), non-fungible token (NFT) domain names, a fungible token, a wallet address, etc. In addition, present invention embodiments may receive a Web2 domain name and return values (from the blockchain) that are resolved using the blockchain asset associated with the domain name or with specific DNS records.

BACKGROUND

Discussion of the Related Art

Web2 generally refers to a version of the web (or Internet) that utilizes a Domain Name System (DNS) to translate domain names into corresponding Internet Protocol (IP) addresses in order to access a web site. Domain Name System (DNS) creates a set of one or more records when a domain name is registered. DNS records (or text files) reside in DNS servers and provide information pertaining to a domain name including an associated IP address and request handling. However, DNS records may be maliciously modified by anyone with authorization to modify the records associated with the domain name.

SUMMARY

According to one embodiment of the present invention, a system for managing domain information for an off-chain domain comprises one or more memories and at least one processor coupled to the one or more memories. The system associates the domain information for the off-chain domain with a blockchain asset. The domain information is retrieved from a blockchain based on the blockchain asset. Embodiments of the present invention further include a method and computer program product (e.g., including one or more computer readable media with instructions executable by one or more processors) for managing domain information for an off-chain domain in substantially the same manner described above.

BRIEF DESCRIPTION OF THE DRAWINGS

Generally, like reference numerals in the various figures are utilized to designate like components.

FIG. 6 is a schematic illustration of an example graphical user interface associating an off-chain domain with a blockchain asset according to an embodiment of the present invention.

DETAILED DESCRIPTION

Web2 generally refers to a version of the web (or Internet) that utilizes a Domain Name System (DNS) to translate domain names into corresponding Internet Protocol (IP) addresses in order to access a web site. Domain Name System (DNS) creates a set of one or more records when a domain name is registered. DNS records (or text files) reside in DNS servers and provide information pertaining to a domain name including an associated IP address and request handling. However, DNS records may be maliciously modified by anyone with authorization to modify the records associated with the domain.

Web3 generally refers to a decentralized version of the web (or Internet) based on blockchains and peer-to-peer networks. An embodiment of the present invention enables updates to Domain Name System (DNS) records for a Web2 domain based on an association to a Web3 domain. In other words, the present invention embodiment updates records for an off-chain domain (e.g., Web2, DNS, or other domain not residing on a blockchain, etc.) based on an association to an on-chain domain or other asset (e.g., Web3 or other domain or asset residing on a blockchain, etc.). In particular, the present invention embodiment may associate records (e.g., DNS records, etc.) for an off-chain domain (e.g. Web2, etc.) with a blockchain asset and restrict modification of the records to an authorized user that can sign with their blockchain public key. A blockchain asset may include any digital asset or item that identifies, is associated with, or includes objects stored on a blockchain, such as a set of records, an object that points to a set of records, non-fungible token (NFT), non-fungible token (NFT) domain names, a fungible token, a wallet address, etc. The blockchain asset is preferably associated with a user wallet that is used to verify the user based on the user signing a message within the wallet using cryptographic keys.

In addition, conventional tools may receive a Web2 domain name and return a list of Domain Name System (DNS) records and values. However, present invention embodiments may receive a Web2 domain name and return values (from the blockchain) that are resolved using the blockchain asset associated with the domain name or with specific DNS records.

Figure 1:
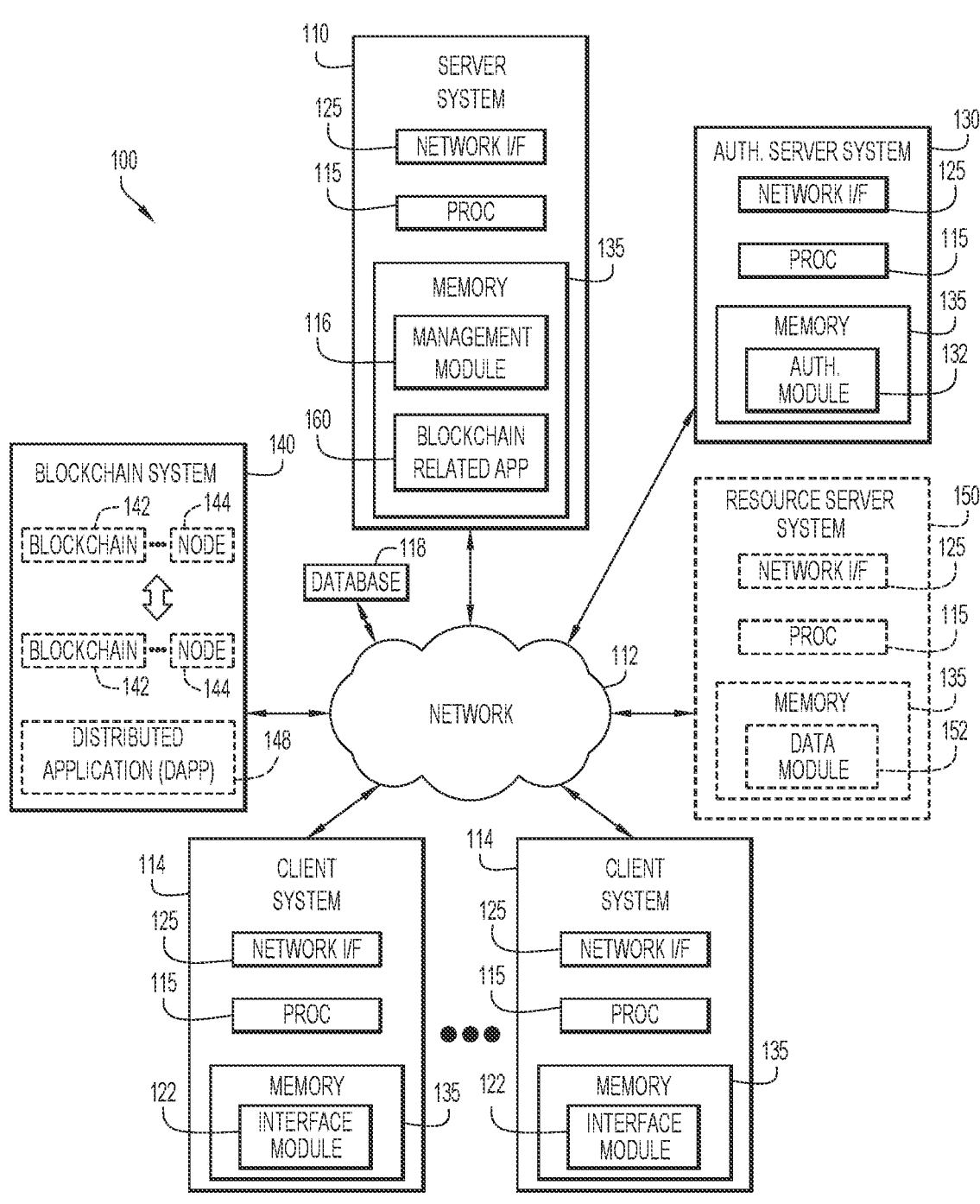
FIG. 1 is a diagrammatic illustration of an example computing environment according to an embodiment of the present invention.

An example environment 100 for use with present invention embodiments is illustrated in FIG. 1. Specifically, environment 100 includes one or more server systems 110, one or more client or end-user systems 114, one or more authentication server systems 130, and one or more block-chain systems 140 each implementing and maintaining at least one corresponding blockchain 142. Environment 100 may further include one or more resource server systems 150. Server systems 110, client systems 114, authentication server systems 130, blockchain systems 140, and/or resource server systems 150 may be remote from each other and communicate over a network 112. The network may be implemented by any number of any suitable communications media (e.g., wide area network (WAN), local area network (LAN), Internet, Intranet, etc.). Alternatively, server systems 110, client systems 114, authentication server systems 130, blockchain systems 140, and/or resource server systems 150 may be local to each other, and communicate via any appropriate local communication medium (e.g., local area network (LAN), hardware, wireless link, Intranet, etc.).

Server systems 110 include a management module 116. Management module 116 may interface with a user via client system 114, and/or may be of the form of an Application Programming Interface (API) to perform domain management (e.g., manage Domain Name System (DNS) records, etc.). The management module may process requests from any entities (e.g., user, application, service, computing or other device, etc.).

Client systems 114 may include an interface module 122 to provide a graphical user (e.g., GUI, etc.) or other interface (e.g., command line prompts, menu screens, etc.) that enables users to access server systems 110 for managing domains. The interface module may include any conventional or other browser to access server systems 110.

Authentication server systems 130 include an authentication module 132 that authenticates a user as corresponding to a blockchain asset. The blockchain asset may include any digital asset or item that identifies, is associated with, or includes objects stored on a blockchain, such as a set of records, an object that points to a set of records, non-fungible token (NFT), non-fungible token (NFT) domain names, a fungible token, a wallet address, etc. The authentication module may process requests from any entities (e.g., user, application, service, computing or other device, etc.).

Blockchain systems 140 may each include one or more nodes 144 to implement and maintain at least one corresponding blockchain 142. The nodes may be implemented by any suitable computing devices (e.g., as described below for FIG. 2). The blockchain is generally in the form of a ledger that includes a series of records or blocks chained or linked together. The blockchain is typically managed by a peer-to-peer network (of nodes 144) and used as a distributed ledger. Nodes 144 of the peer-to-peer network communicate and verify new blocks according to a protocol. The peer-to-peer network provides a decentralized approach, where each node has a copy of a blockchain 142. Transactions are transmitted to the peer-to-peer network, where mining nodes (nodes 144) process the transactions. The mining nodes validate a transaction, insert the transaction into a current block, and transmit the block to the other nodes. Blockchain 142 may be implemented by any conventional or other blockchain, and may be a public (e.g., no access restrictions, etc.), private (e.g., restricted access, etc.), or hybrid (e.g., with centralized and decentralized features) blockchain.

Blockchain systems 140 may include one or more distributed or decentralized applications (dApps) 148 to perform various operations (e.g., financial or other transactions or operations related to a blockchain, etc.). The blockchain assets may be associated with the same and/or various different blockchains.

Interface module 122 of client systems 114 may further provide a graphical user (e.g., GUI, etc.) or other interface (e.g., command line prompts, menu screens, etc.) that enables users to access distributed applications (dApps) 148 on blockchain systems 140 for performing various operations (e.g., financial or other transactions or operations related to a blockchain, etc.). The interface module may include any conventional or other browser to access the distributed applications (dApps) of blockchain systems 140. The interface module may natively, or include extensions to, access the distributed applications (dApps). The interface module may provide a user interface to serve as a front end for a distributed application (dApp) 148, where back end processing for the distributed application (dApp) is performed on a blockchain system 140. Client systems 114 may further provide reports or notifications pertaining to requests from users (e.g., results of an access request, verification results, etc.).

Server systems 110 further include one or more blockchain related applications 160 for performing various operations (e.g., transactions or operations related to a blockchain, access domain information based on an associated blockchain asset, etc.). Management module 116 and blockchain related applications 160 may be on the same or different server systems 110. The blockchain related application may process requests from any entities (e.g., user, application, service, computing or other device, etc.).

Resource server systems 150 include a data module 152 that may store and retrieve domain information based on blockchain assets of users for various blockchains. The resource server systems may provide off-chain storage and access for the domain information.

A database system 118 may store various information for the user verification and/or domain (e.g., login results, domain information, mappings of blockchain identities to blockchains, etc.). The database system may be implemented by any conventional or other database or storage unit, may be local to or remote from server systems 110, client systems 114, authentication server systems 130, blockchain systems 140, and/or resource server systems 150, and may communicate via any appropriate communication medium (e.g., local area network (LAN), wide area network (WAN), Internet, hardwire, wireless link, Intranet, etc.).

Server systems 110, client systems 114, authentication server systems 130, and resource server systems 150 may be implemented by any conventional or other computer systems preferably equipped with a display or monitor, a base, optional input devices (e.g., a keyboard, mouse or other input device), and any software for use by present invention embodiments (e.g., server/communications software, blockchain software, management module 116, interface module 122, authentication module 132, data module 152, blockchain related applications 160, etc.). The base may include at least one hardware processor 115 (e.g., microprocessor, controller, central processing unit (CPU), etc.), one or more memories 135, and/or internal or external network interfaces or communications devices 125 (e.g., modem, network cards, etc.)).

Management module 116, interface module 122, authentication module 132, data module 152, distributed applications (dApps) 148, and blockchain related applications 160 may include one or more modules or units to perform the various functions of present invention embodiments described below. The various modules (e.g., management module 116, interface module 122, authentication module 132, data module 152, blockchain related applications 160, etc.) may be implemented by any combination of any quantity of software and/or hardware modules or units, and may reside within memory 135 of the server and/or client systems for execution by a corresponding processor 115. The various modules of the blockchain (e.g., distributed applications (dApps) 148, etc.) may be implemented by any combination of any quantity of software and/or hardware modules or units, and may reside on a blockchain 142 for execution by one or more nodes 144.

Figure 2:
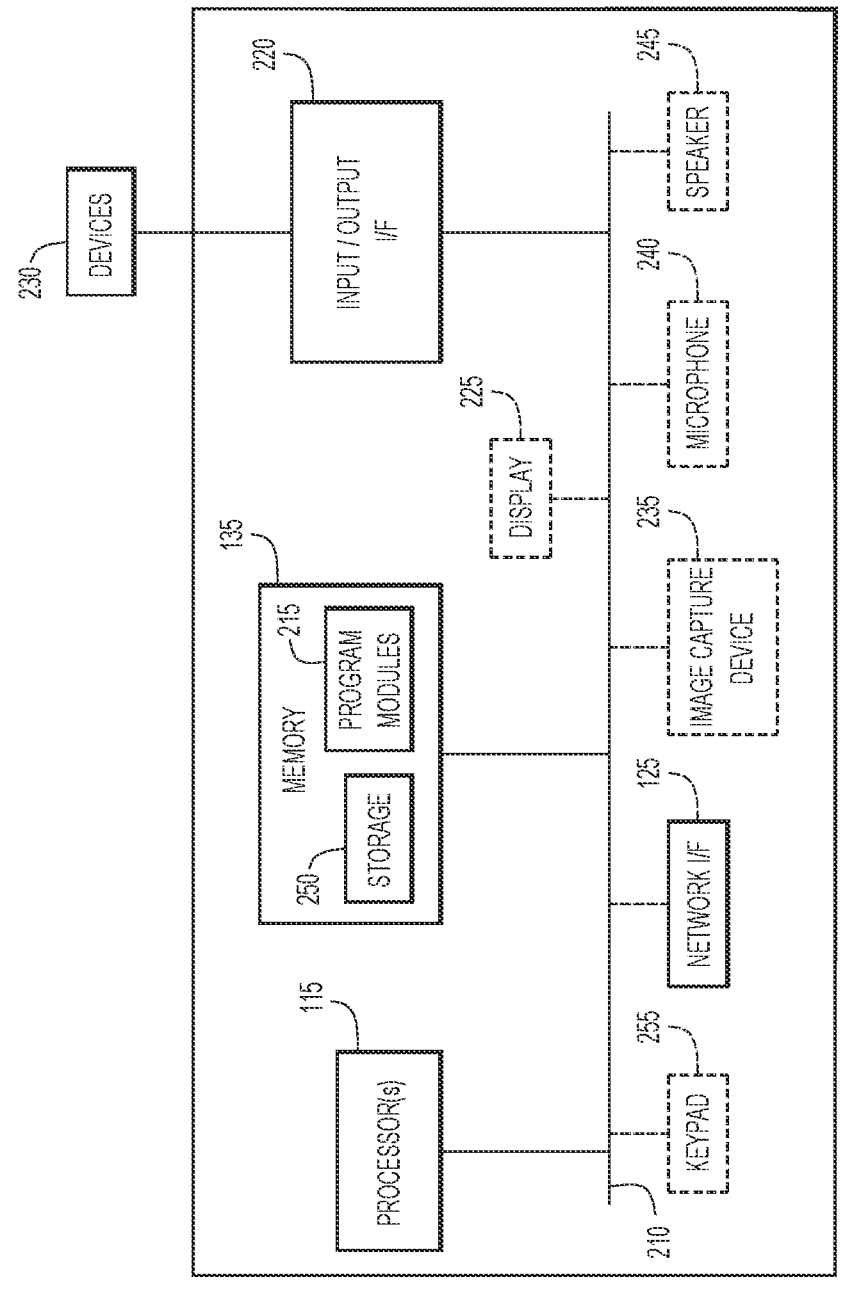
FIG. 2 is a block diagram of an example computing device according to an embodiment of the present invention.

An example of a computing device 200 for environment 100 (e.g., implementing server systems 110, client systems 114, authentication server systems 130, blockchain systems 140, nodes 144, resource server systems 150, etc.) is illustrated in FIG. 2. The example computing device may perform the functions of present invention embodiments described herein. Computing device 200 may be implemented by any personal or other type of computer or processing system (e.g., desktop, laptop, hand-held device, smartphone or other mobile device, etc.), and may be used for any computing environments (e.g., cloud computing, client-server, network computing, mainframe, stand-alone systems, etc.).

Computing device 200 may include one or more processors 115 (e.g., microprocessor, controller, central processing unit (CPU), etc.), network interface 125, memory 135, a bus 210, and an Input/Output interface 220. Bus 210 couples these components for communication, and may be of any type of bus structure, including a memory bus or memory controller, a peripheral bus, and a processor or local bus using any of a variety of conventional or other bus architectures. Memory 135 is coupled to bus 210 and typically includes computer readable media including volatile media (e.g., random access memory (RAM), cache memory, etc.), non-volatile media, removable media, and/or non-removable media. For example, memory 135 may include storage 250 containing nonremovable, non-volatile magnetic or other media (e.g., a hard drive, etc.). The computing device may further include a magnetic disk drive and/or an optical disk drive (not shown) (e.g., CD-ROM, DVD-ROM or other optical media, etc.) connected to bus 210 via one or more data interfaces.

Moreover, memory 135 includes a set of program modules 215 (e.g., corresponding to management module 116, interface module 122, authentication module 132, data module 152, blockchain software (e.g., distributed applications (dApp) 148, blockchain management software, etc.), blockchain related applications 160, network site or service software, etc.) that are configured to perform functions of present invention embodiments described herein. The memory may further include an operating system, at least one application and/or other modules, and corresponding data. These may provide an implementation of a networking environment.

Input/Output interface 220 is coupled to bus 210 and communicates with one or more peripheral or external devices 230 (e.g., a keyboard, mouse or other pointing device, a display, sensing devices, etc.), at least one device that enables a user to interact with computing device 200, and/or any device (e.g., network card, modem, etc.) that enables computing device 200 to communicate with one or more other computing devices. Computing device 200 may communicate with one or more networks (e.g., a local area network (LAN), a wide area network (WAN), a public network (e.g., the Internet), etc.) via network interface 125 coupled to bus 210.

With respect to certain entities (e.g., client system 114, etc.), computing device 200 may further include, or be coupled to, a touch screen or other display 225, a camera or other image capture device 235, a microphone or other sound sensing device 240, a speaker 245 to convey sound, and/or a keypad or keyboard 255 to enter information (e.g., alphanumeric information, etc.). These items may be coupled to bus 210 or Input/Output interface 220 to transfer data with other elements of computing device 200.

Initially, a blockchain (e.g., blockchain 142, etc.) is generally in the form of a ledger that includes a series of records or blocks chained or linked together. Each block includes a hash of the prior block in the blockchain, a timestamp, and transaction information. The hash of the prior block enables the blockchain to be resistant to modification since changes to data in any prior block alter the hash value which propagates to subsequent blocks.

A blockchain is typically managed by a peer-to-peer network and used as a distributed ledger. Nodes of the peer-to-peer network communicate and verify new blocks according to a protocol. The peer-to-peer network provides a decentralized approach, where each node has a copy of the blockchain. Transactions are transmitted to the network, where mining nodes process the transactions. The mining nodes validate a transaction, insert the transaction into a current block, and transmit the block to the other nodes. Various consensus approaches may be used for combining validation results of different mining nodes to determine validity of a transaction (or block).

Users of transactions for the blockchain are authenticated based on cryptographic keys. These keys identify a user and provide access to a user account or wallet. The user wallet is basically an application or software that enables users to store and access digital assets (e.g., for receiving or sending cryptocurrency or other fungible tokens, non-fungible tokens (NFTs), etc.). For example, a non-fungible token (NFT) is a crypto type asset with each token being unique (and representing items, such as digital art, music, or video game items), whereas fungible tokens (e.g., coins of the same cryptocurrency) have the same value of worth and are exchangeable. Each user is associated with their own private key (e.g., accessible only to the associated user, etc.) and a public key (e.g., typically an address on the blockchain). The private and public keys enable authentication of the user based on digital signatures in order to commence a transaction. The user account or wallet typically stores the private key.

For example, in order for the user to send cryptocurrency, a message for a transaction is encrypted with the private key of the user wallet. The private key enables only the user to control the user wallet. A digital signature is created by encrypting the message with the private key, where the digital signature is used to verify the user and transaction. The message may be decrypted with the corresponding public key of the user wallet. Since the private key is unique to the user, successful decryption of the message with the corresponding public key verifies the message was sent by the user. Once verified, the transaction may be posted to the blockchain, thereby adjusting the user wallet based on the transaction.

In addition, a blockchain may store software (e.g., typically referred to as smart contracts) that executes in response to occurrence of pre-defined conditions. A smart contract is generally software or a program that runs on the blockchain. The code and data for the smart contract reside at a specific address on the blockchain. Non-fungible tokens (NFTs) are controlled by smart contracts that handle transference and verification of ownership of the non-fungible tokens (NFTs). A blockchain may be public (e.g., no access restrictions, etc.), private (e.g., restricted access, etc.), or hybrid (e.g., with centralized and decentralized features).

A blockchain domain name is stored on a blockchain. The blockchain domain name may be a non-fungible token (NFT) domain name that is associated with a non-fungible token (NFT) stored in a user wallet. The blockchain domain name may be associated with various information (e.g., wallet addresses, user information (e.g., name, address, email, etc.), data or other access restrictions, etc.). The blockchain domain name is associated with software or smart contracts on the blockchain that may perform various functions (e.g., provide a registry for corresponding wallet addresses, indicate locations of content for the domain (e.g., or a website, etc.) hosted on the blockchain or other system, etc.). In order to access a blockchain domain, the blockchain is accessed to find the record corresponding to the blockchain domain name (which may initiate the corresponding smart contracts for the corresponding functionality). The private key of the user wallet enables the user to have sole control of the blockchain domain name (e.g., authenticating operations or transactions for the blockchain domain name similar to the cryptocurrency example described above, etc.). For example, the user may have sole control to perform operations that alter content and/or functionality for the blockchain domain name.

Figure 3:
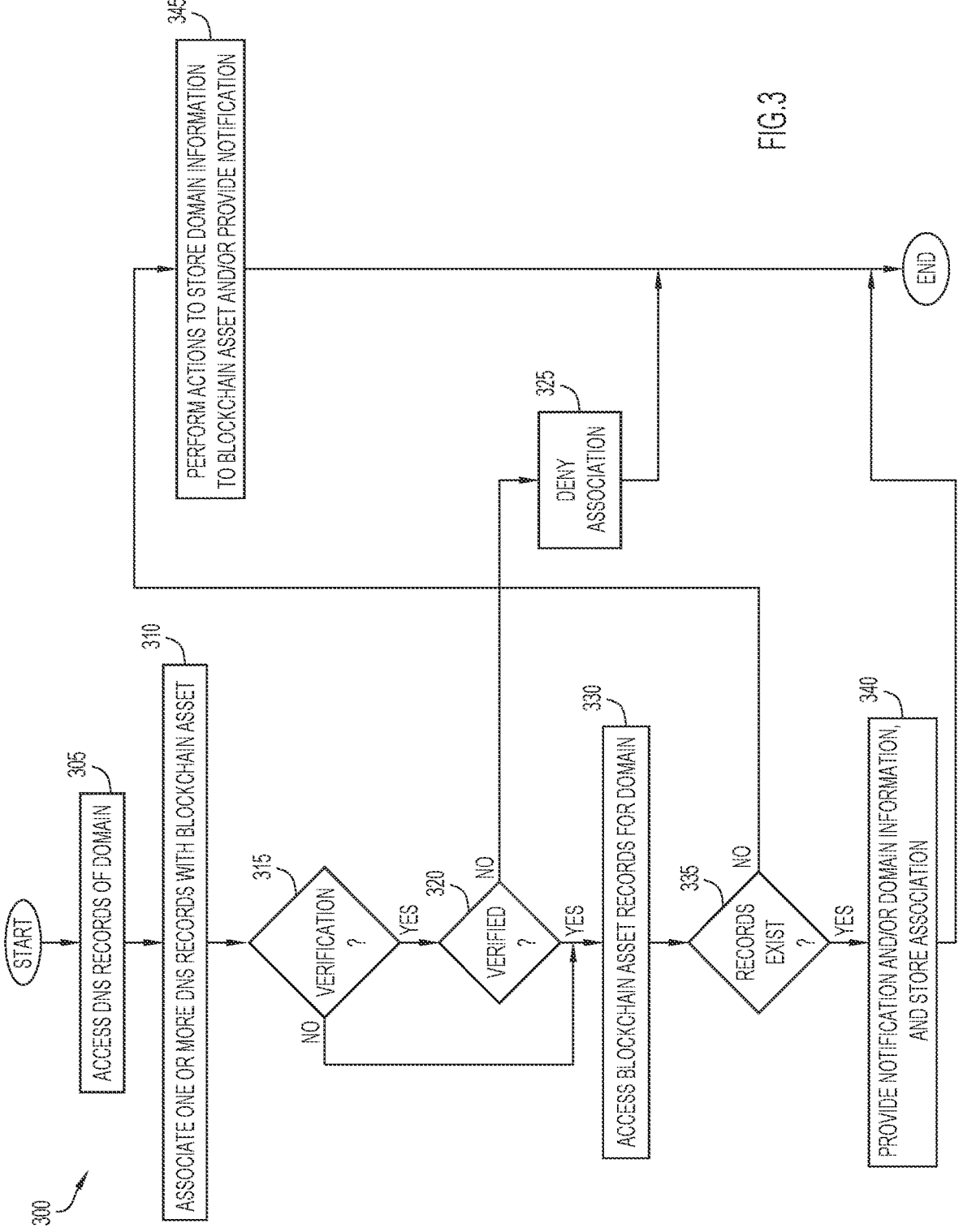
FIG. 3 is a flowchart of a method of associating an off-chain domain (e.g., of Web2 or Domain Name System (DNS)) with a blockchain asset according to an embodiment of the present invention.

A method 300 of associating an off-chain domain (e.g., Web2 or Domain Name System (DNS), etc.) with a blockchain asset (e.g., via management module 116, authentication module 132, blockchain related application 160, server system 110, client system 114, authentication server system 130, blockchain system 140, and/or resource server system 150) according to an embodiment of the present invention is illustrated in FIG. 3. Initially, users may register off-chain domains on Web2 or with Domain Name System (DNS). DNS creates a set of one or more records when a domain name is registered. By way example, the records may include records of one or more record types including an address (or A) record, a hostname pointing (or CNAME alias) record, a mail (or MX) record, a name server (or NS) record, a private name server record, a start of authority (or SOA) record, a text (or TXT/SPF) record, and a service (or SRV) record.

A user desires to associate an off-chain domain with a blockchain asset (or otherwise modify Domain Name System (DNS) or other records for the off-chain domain), and selects one of their existing off-chain domain names within management module 116 (or other management software of a corresponding domain registrar) at operation 305. A blockchain asset may include any digital asset or item that identifies, is associated with, or includes objects stored on a blockchain, such as a set of records, an object that points to a set of records, non-fungible token (NFT), non-fungible token (NFT) domain names, a fungible token, a wallet address, etc. Management module 116 accesses the DNS records for the selected domain name (e.g., from DNS servers, etc.) and displays the DNS records on a user interface (FIGS. 6 and/or 8). This may be accomplished by the user accessing a corresponding account of the user via management module 116.

Management module 116 associates one or more Domain Name System (DNS) or other records with a blockchain asset indicated by the user or other entity at operation 310. For example, the user may enter an identifier for the blockchain asset (e.g., blockchain domain name, non-fungible token (NFT) name, wallet address, etc.) on the user interface for the selected off-chain domain or for one or more corresponding DNS or other records (e.g., as described below for FIGS. 6 and 8). Further, the management module may perform a look-up of blockchain assets of the user (e.g., based on user profile information of the account) and provide a mechanism (e.g., drop-down list, menu, etc.) on the user interface to enable selection of a blockchain asset. In addition, the management module may receive a URL or address of the location of the blockchain asset. The blockchain asset identifier may include any quantity of terms, words, tokens, or arrangements of any quantity of any types of elements (e.g., alphanumeric or other characters, symbols, numbers, etc.). For example, the blockchain asset identifier may include a name portion and an optional extension (e.g., "name.e1", etc.). Alternatively, the blockchain asset identifier may include the name portion without the extension. The name portion and extension may each include any quantity of terms, words, tokens, or arrangements of any quantity of any types of elements (e.g., alphanumeric or other characters, symbols, numbers, etc.).

When verification of the blockchain asset is required as determined at operation 315, management module 116 verifies the blockchain asset at operation 320. This may be accomplished using conventional or other public/private key encryption techniques. For example, management module 116 (via blockchain related application 160) may request authentication module 132 to obtain a signed message from the user. In this case, blockchain related application 160 accesses the information stored for the blockchain asset on a blockchain and/or in an off-chain database to obtain a wallet address. By way of example, a blockchain 142 associated with a blockchain asset in the form of a non-fungible token (NFT) domain (via a blockchain system 140) may be accessed to obtain a blockchain (or wallet) address corresponding to the non-fungible token (NFT) domain name provided by the user. The associated blockchain may be determined based on the name (e.g., a blockchain corresponding to an extension, etc.), a mapping of blockchain assets to blockchains, or a blockchain indication received from the user with the blockchain asset. A transaction for the non-fungible token (NFT) domain name may be identified on the associated blockchain, and the blockchain (or wallet) address for the non-fungible token (NFT) domain name may be ascertained from information stored on the associated blockchain for the transaction.

Management module 116 provides the blockchain (or wallet) address for the blockchain asset to authentication module 132 (via blockchain related application 160). The authentication module generates a message that is sent to the blockchain (or wallet) address for the blockchain asset for the user to sign at operation 320. The user logs in or otherwise accesses the wallet (e.g., via a username and password, wallet verification, etc.) in order to sign the message and verify the user. The signature may be provided on a user interface of client system 114 (e.g., as described below for FIG. 7). Blockchain related application 160 monitors the wallet until a successful verification is detected or a time out has occurred (e.g., a time interval has expired, etc.) as determined at operation 320. The time out may be a predetermined time interval sufficient to enable the user to perform the signing, and preferably in a range from one through five minutes. However, any time interval may be used for the time out.

By way of example, signing of the message in the wallet generates a digital signature of the message based on the private key of the wallet. The signed message or digital signature is decrypted for verification by authentication module 132 based on a public key corresponding to the wallet (e.g., blockchain (or wallet) address, etc.). Since the private key is unique to the wallet, successful decryption of the message with the corresponding public key verifies the message was signed by the user.

When the time out occurs (e.g., the predetermined time interval expires, etc.) without detecting a successful verification as determined at operation 320, the verification of the blockchain asset fails. For example, the signed message may have failed the message verification, or the user was unable to access the wallet to sign the message prior to occurrence of the timeout (e.g., expiration of the predetermined time interval, etc.). When the verification fails as determined at operation 320, the blockchain asset is not associated with the off-chain domain or Domain Name System (DNS) or other records at operation 325. A message may be provided to the user indicating the failed verification, and may further indicate a reason for the failure (e.g., timeout, invalid digital signature, etc.).

When the verification is successful prior to occurrence of the timeout (e.g., expiration of the predetermined time interval, etc.) as determined at operation 320, the user is determined to be associated with the blockchain asset. The signing of the message by the user verifies the user as the owner of the wallet (and as corresponding to the blockchain asset).

When no verification is required (as determined at operation 315) or a required verification is successful (as determined at operation 320), blockchain related application 160 accesses the corresponding records of the blockchain asset at operation 330 in order to verify existence of domain information. The blockchain asset records may contain domain information, and may be stored on a blockchain or in off-chain storage (e.g., database system 118, resource server system 150, etc.). The blockchain asset records may be retrieved based on the blockchain asset identifier and/or information associated with the registered user (e.g., wallet address, etc.). For example, a blockchain asset record may include a designated section or block (e.g., named "dns", etc.) with key/value pairs to provide values for DNS or other record attributes. The key may specify the record type or record name with a corresponding value (e.g., key:value).

When the blockchain asset records are present (e.g., contain domain information, etc.) as determined at operation 335, management module 116 may provide notification and/or provide information from the blockchain asset records, and stores the association (e.g., blockchain asset identifier, etc.) in DNS servers or other off-chain storage at operation 340. For example, domain information may be looked-up by blockchain related application 160 based on the blockchain asset (and key/value pairs). When the information exists, the domain information and/or a notification of existence of the domain information may be provided. Further, the blockchain may provide the domain information and corresponding authentication information (e.g., signature, Merkle proof, etc.) to enable the domain information to be verified (e.g., blockchain related application 160 may process the authentication information to verify the domain information) in substantially the same manner described below.

The domain information (with or without verification) may be provided to the user for confirmation. By way of example, the domain information may be presented on a user interface in response to a cursor placed over the corresponding blockchain asset identifier. Further, the domain information may replace the blockchain asset on the user interface. When the information is incorrect (or invalid), the user may update the domain information by inserting a different blockchain asset or storing updated information for the blockchain asset.

When the blockchain asset records are not present as determined at operation 335, management module 116 may provide notification of absence of blockchain asset records and/or perform actions to store domain information to a blockchain asset at operation 345. For example, the management module may present a warning message to the user on the user interface (FIGS. 6 and/or 8). The management module may further enable the user to enter a value for domain information that is persisted or stored within the blockchain asset (via blockchain related application 160) after a signature verification. The signature verification may be performed in substantially the same manner described herein. Moreover, when no blockchain asset records exist, a new record may be generated for the blockchain asset (via blockchain related application 160) with user provided domain information. Alternatively, the management module may direct the user to a separate on-chain asset management system to add missing records.

In addition, when no blockchain asset exists, a new digital asset may be generated and records for the domain information may be added to the blockchain asset (via blockchain related application 160) with user provided domain information.

Figure 4:
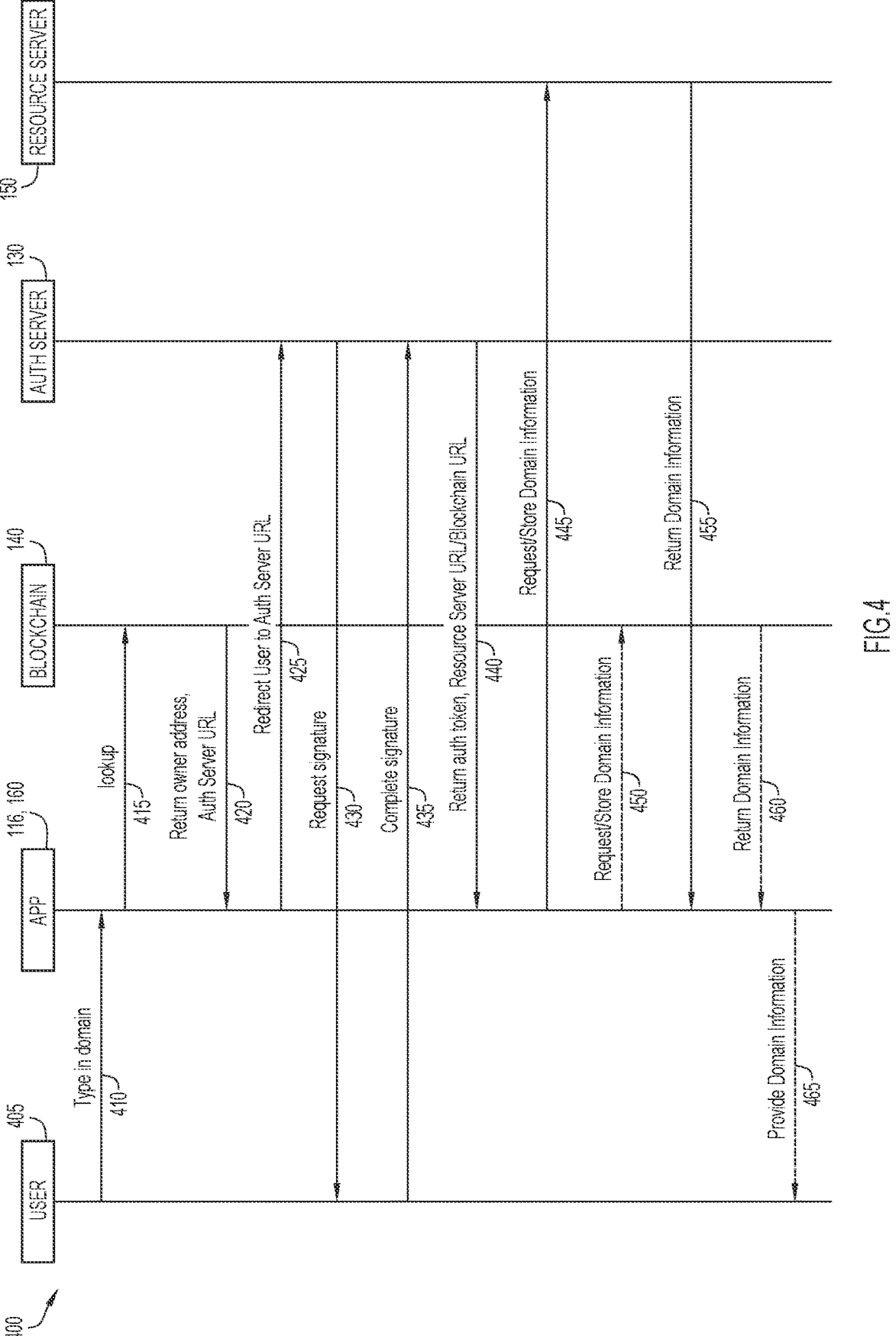
FIG. 4 is flow diagram of a method of verifying a blockchain asset according to an embodiment of the present invention.

A method 400 of verifying a blockchain asset (e.g., via management module 116, interface module 122, authentication module 132, data module 152, blockchain related application 160, server system 110, client system 114, authentication system 130, blockchain system 140, and/or resource server system 150) according to an embodiment of the present invention is illustrated in FIG. 4. Initially, users may register off-chain domains (e.g., on Web2 or with Domain Name System (DNS), etc.). DNS creates a set of one or more records when a domain name is registered. A user 405 desires to associate an off-chain domain with a blockchain asset, and selects one of their existing off-chain domain names within management module 116 (or other management software of a corresponding domain registrar) as described above.

Management module 116 receives a blockchain asset indicated by user 405 at operation 410, and provides the blockchain asset to blockchain related application 160. For example, the user may enter an identifier for the blockchain asset on the user interface for the off-chain domain or for one or more corresponding DNS or other records (e.g., as described below for FIGS. 6 and 8). The blockchain asset may include any digital asset or item that identifies, is associated with, or includes objects stored on a blockchain, such as a set of records, an object that points to a set of records, non-fungible token (NFT), non-fungible token (NFT) domain names, a fungible token, a wallet address, etc. Further, the blockchain asset identifier may include any quantity of terms, words, tokens, or arrangements of any quantity of any types of elements (e.g., alphanumeric or other characters, symbols, numbers, etc.). For example, the blockchain asset identifier may include a name portion and an optional extension (e.g., "name.e1", etc.). Alternatively, the blockchain asset identifier may include the name portion without the extension. The name portion and extension may each include any quantity of terms, words, tokens, or arrangements of any quantity of any types of elements (e.g., alphanumeric or other characters, symbols, numbers, etc.).

Blockchain related application 160 accesses a blockchain 142 associated with the blockchain asset (via a blockchain system 140), and performs a look-up for the blockchain asset at flow 415. The associated blockchain may be determined based on the name (e.g., a blockchain corresponding to an extension, etc.), a mapping of blockchain assets to blockchains, or a blockchain indication received from the user with the identifier of the blockchain asset. For example, a transaction for a blockchain asset in the form of a non-fungible token (NFT) domain may be identified on the associated blockchain based on the name of the non-fungible token (NFT) domain, and the blockchain (or wallet) address for the non-fungible token (NFT) domain may be ascertained from information stored on the associated blockchain for the transaction.

The blockchain system returns a blockchain (or wallet) address of the user corresponding to the blockchain asset and a uniform resource locator (URL) or address of authentication server system 130 at flow 420. Blockchain related application 160 redirects user 405 (or client system 114) to the authentication server system at flow 425 to verify the user corresponds to the blockchain asset. This may be accomplished using conventional or other public/private key encryption techniques. For example, blockchain related application 160 may provide authentication module 132 of authentication server system 130 the blockchain (or wallet) address of the user corresponding to the blockchain asset in order to obtain a signed message from the user. In this case, the authentication module generates a message that is sent to the wallet of the blockchain asset for the user to sign at flow 430 in substantially the same manner described above. User 405 signs the message at flow 435 by accessing a user account associated with the wallet. The signing of the message by the user verifies the user as corresponding to the blockchain asset in substantially the same manner described above.

Authentication module 132 of authentication server system 130 provides to blockchain related application 160 a token indicating the user verification for the blockchain asset at flow 440. Management module 116 receives indication of the verification and may provide information from blockchain asset records as described above for confirmation.

For example, authentication module 132 of authentication server system 130 may further provide a uniform resource locator (URL) or address of a resource server system 150 storing the corresponding domain information at flow 440. Blockchain related application 160 requests the domain information from data module 152 of resource server system 150 at flow 445. The blockchain related application further provides the token from the authentication server system to verify the user as corresponding to the blockchain asset to the resource server system. The data module retrieves and provides the requested domain information to management module 116 (via blockchain related application 160) at flow 450. The domain information may be retrieved based on information associated with the user (e.g., wallet address, etc.). The information associated with the user is accessible or known, and may be provided to the blockchain related application (and data module). By way of example, the blockchain asset identifier can be used to ascertain the wallet address, etc.

Alternatively, the domain information may be stored on a corresponding blockchain 142. In this case, authentication module 132 of authentication server system 130 provides to blockchain related application 160 a token indicating the user verification and a uniform resource locator (URL) or other indicator of a blockchain system 140 storing the domain information at flow 440. Blockchain related application 160 requests the domain information from blockchain system 140 at flow 455. The blockchain related application further provides the token from the authentication server system to verify the user as corresponding to the blockchain asset to the blockchain system. The blockchain system retrieves and provides the requested domain information to management module 116 (via blockchain related application 160) at flow 460. The domain information may be retrieved based on information associated with the user (e.g., wallet address, etc.). The information associated with the user is accessible or known. For example, a blockchain asset identifier can be used to ascertain the wallet address, etc.

Management module 116 notifies user 405 (via client system 114) of the domain information at flow 465.

Figure 5:
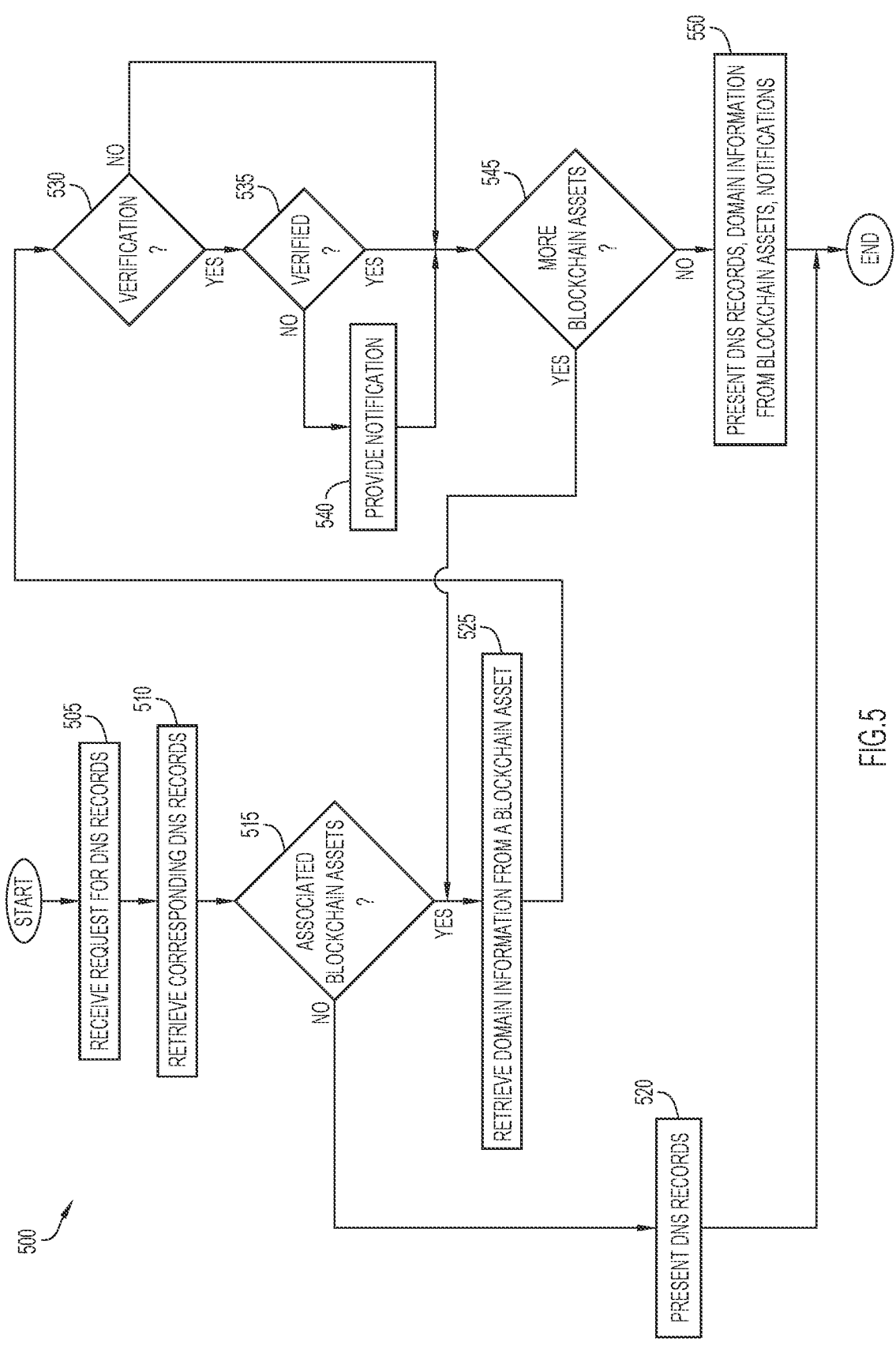
FIG. 5 is a flowchart of a method of accessing domain information for an off-chain domain based on an associated blockchain asset according to an embodiment of the present invention.

When a Domain Name System (DNS) or other record is queried, the value from the record is obtained through resolution of the DNS or other record key (e.g., blockchain asset) used to perform the look-up. A method 500 of accessing domain information for an off-chain domain based on an associated blockchain asset (e.g., via management module 116, interface module 122, blockchain related application 160, data module 152, server system 110, client system 114, blockchain system 140, and/or resource server system 150) according to an embodiment of the present invention is illustrated in FIG. 5. Initially, users may register off-chain domains (e.g., on Web2 or with Domain Name System (DNS), etc.). DNS creates a set of one or more records when a domain name is registered. In addition, users may associate an off-chain domain with a blockchain asset as described above.

Initially, a request for Domain Name System (DNS) or other records for an off-chain domain is received by management module 116 at operation 505. The request may include the off-chain domain name, and be from various entities (e.g., user, application, device, etc.). The management module retrieves the corresponding DNS or other records at operation 510 (e.g., from DNS servers or other storage, etc.). The DNS or other records may indicate values for corresponding domain parameters, where a value may include an identifier for a blockchain asset.

Management module 116 examines the values to determine a presence of one or more blockchain assets. For example, a blockchain asset may be associated with all of the Domain Name System (DNS) or other records of the off-chain domain, or specific DNS or other records.

When no blockchain assets are present as determined at operation 515, management module 116 presents values of the retrieved Domain Name System (DNS) or other records on a user interface at operation 520 in substantially the same manner described above.

When one or more blockchain assets are present as determined at operation 515, management module 116 provides the blockchain asset identifier to blockchain related application 160 to retrieve domain information from the blockchain asset at operation 525. For example, blockchain related application 160 may access the corresponding records of the blockchain asset in substantially the same manner described above. The blockchain asset records contain domain information, and may be stored on a blockchain or in off-chain storage (e.g., database system 118, resource server system 150, etc.) as described above. By way of example, a blockchain asset record may include a designated section or block (e.g., named "dns", etc.) with key/value pairs to provide values for DNS or other record attributes. The key may specify the record type or record name with a corresponding value (e.g., key:value).

The blockchain asset records may be retrieved based on the blockchain asset identifier, key/value pairs, and/or information associated with the registered user (e.g., wallet address, etc.). The blockchain asset records are examined to extract domain information for the domain (e.g., based on the key/value pairs, etc.).

When verification of the domain information is required as determined at operation 530, the blockchain may provide the domain information and corresponding authentication information (e.g., signature, Merkle proof, etc.) to enable the domain information to be verified at operation 535. For example, blockchain related application 160 may process the authentication information (e.g., decrypt an encrypted signature, analyze a Merkle proof, etc.) to verify the domain information. When the domain information fails the verification as determined at operation 535, a notification is generated and provided at operation 540.

The above process repeats from operation 525 until each blockchain asset has been processed to retrieve domain information as determined at operation 545. Once the blockchain assets have been processed, management module 116 presents values of the retrieved Domain Name System (DNS) or other records, any domain information from blockchain assets, and/or the notifications of invalid domain information on a user interface at operation 550 in substantially the same manner described above.

By way of example, a blockchain may be accessed via interface module 122 (e.g., a browser, etc.) to determine domain information (e.g., IP or other address, etc.) for a domain. Initially, a user may provide an off-chain domain name (e.g., DNS, Web2, etc.) to interface module 122 (e.g., browser, etc.) via a client system 114 to visit a website. Interface module 122 performs a look-up for the domain name (e.g., through DNS or other servers, etc.) to determine an IP address for the domain name (or other domain information). The record for the IP address (e.g., name server or other record) is associated with a blockchain asset in substantially the same manner described above. In this case, a DNS or other service may call a blockchain method or function to perform a look-up of the associated blockchain asset on the blockchain. The blockchain asset may include, or be associated with, key/value pairs containing domain information in substantially the same manner described above. A key/value pair of the blockchain asset may include a key corresponding to the record for the IP address and an associated value indicating the IP address. The key/value pair is identified based on the key corresponding to the record (e.g., for the IP address), and the IP address is retrieved from the associated value of the identified key/value pair. The IP address is returned to the interface module (e.g., browser, etc.) to access the website. This enables determination of the IP address on-chain based on the associated blockchain asset, as opposed to a traditional off-chain record look-up.

The technique may be used with any on-chain and/or off-chain domains (with any corresponding top level domains (TLDs)) to enable the domain names to be interchangeable (e.g., any on-chain or off-chain domain names (with any corresponding TLDs) may be used to access the same content or information, such as a website, domain information, etc.). For example, an NFT (on-chain) domain name and a Web2 (off-chain) domain name may each be associated with the same web site (or domain information) and either domain name may be provided to interface module 122 (e.g., browser, etc.) and used to access an address (e.g., IP address, blockchain address, etc.) for that website (or other domain information) from a blockchain in substantially the same manner described above. Further, the technique may be used to retrieve any information for a domain from a blockchain.

Figure 7:
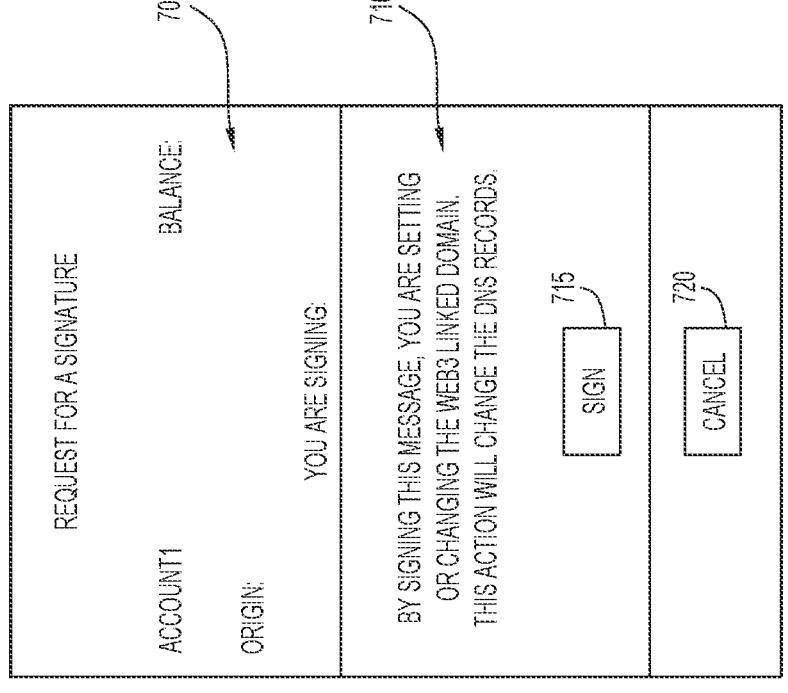
FIG. 7 is a schematic illustration of an example graphical user interface of a wallet verification for verifying a blockchain asset according to an embodiment of the present invention.
Figure 7:
Figure 8:
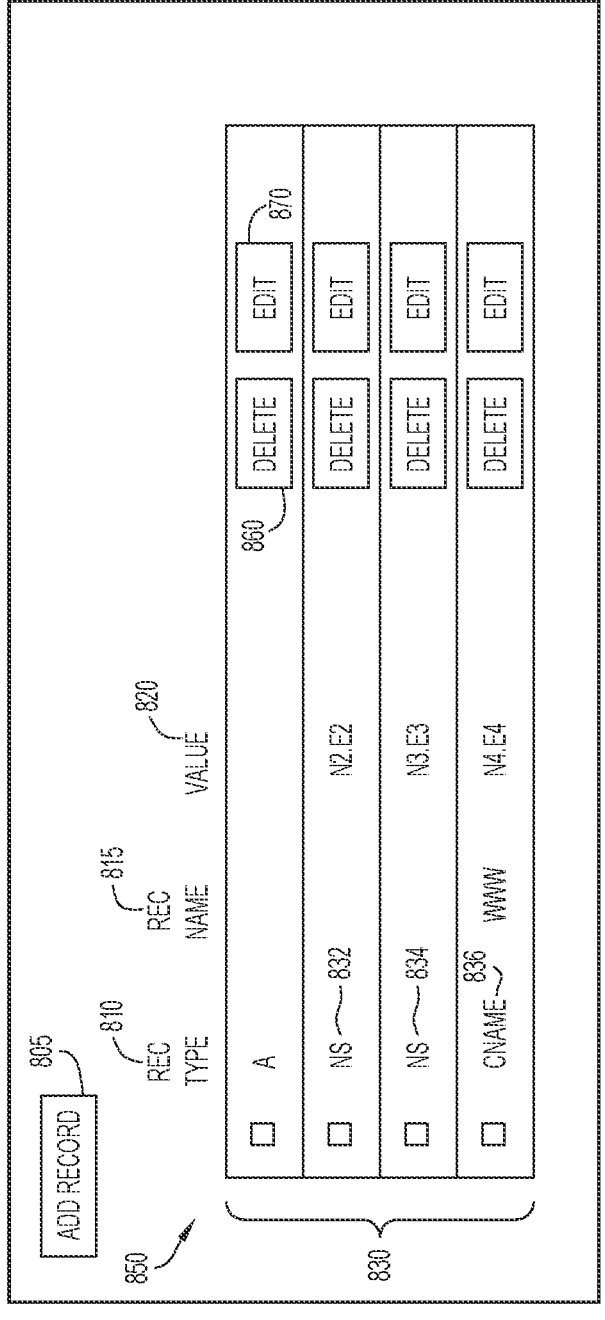
FIG. 8 is a schematic illustration of an example graphical user interface associating individual Domain Name System (DNS) records with a corresponding blockchain asset according to an embodiment of the present invention.

Operation of an embodiment of the present invention for an example scenario is described with respect to FIGS. 6-8. Initially, a Web2 (e.g., Internet Corporation for Assigned Names and Numbers (ICANN)) domain is obtained or registered. This may be accomplished via any conventional or other techniques. An authorized user may access a DNS management system (e.g., management module 116) to obtain information with respect to a Web2 domain and/or attach or associate Web3 (or blockchain asset) records to the domain.

The management module may provide a user interface 600 (FIG. 6) indicating information for a domain. The interface may include record information in the form of a table 650 with rows 625 each corresponding to a Domain Name System (DNS) record, and columns including a record type field 610, a record name field 615, and a value field 620. Record type field 610 indicates the type of DNS record (e.g., an address (or A) record, a hostname pointing (or CNAME alias) record, a mail (or MX) record, a name server (or NS) record, a private name server record, a start of authority (or SOA) record, a text (or TXT/SPF) record, and a service (or SRV) record). Record name field 615 indicates the name of the record, and value field 630 provides the value of the record. In addition, user interface 600 includes an add record actuator 605 to add a DNS record, a delete actuator 660 for each removable row (or record) to delete that row (or record), and an edit actuator 670 for each modifiable row (or record) to edit that row (or record).

When a user desires to associate the domain with a blockchain asset, a new record is added via actuation of add record actuator 605. The user provides a value for the new record that includes an identifier for a blockchain asset containing information for the domain. By way of example, the new DNS record may be a text (TXT) record 630 having a record name, WEB3, and a value of a blockchain asset identifier (e.g., a blockchain domain name, "N1.E1" as viewed in FIG. 6, a wallet address, etc.). The blockchain asset includes records with information for the domain. In other words, the value of the new record points to a mapped Web3 representation of the domain name.

The value for the new record, including the initial value and subsequent modifications of the value, may require an authorized user to sign a transaction using the blockchain domain name or wallet in substantially the same manner described above. For example, a signature request is initiated for a wallet associated with the blockchain asset. The user accesses the wallet and views a user interface 700 (FIG. 7) to sign the message. By way of example, user interface 700 includes an account area 705 indicating account information (e.g., account name, balance, origin, etc.), a message area 710 indicating a message, an actuator 715 to sign the message, and an actuator 720 to cancel the action.

The user actuates actuator 715 to sign the message. Once the message is signed, the value for the record is stored (e.g., on DNS servers, etc.) and the domain is associated with the blockchain asset indicated by the blockchain asset identifier.

The association of a Web2 domain to a blockchain asset may be accomplished on a global basis for the entire domain (e.g., by adding a new record as described above) or on a per record basis. In other words, any DNS record may be associated with a blockchain asset to perform a blockchain look-up based on a blockchain asset (or wallet) address or a blockchain domain name. In this case, management module 116 may provide a user interface 800 (FIG. 8) indicating information for a domain. The interface may be substantially similar to user interface 600 described above (FIG. 6), and include record information in the form of a table 850 with rows 830 each corresponding to a Domain Name System (DNS) record, and columns including a record type field 810, a record name field 815, and a value field 820. Record type field 810 indicates the type of DNS record (e.g., an address (or A) record, a hostname pointing (or CNAME alias) record, a mail (or MX) record, a name server (or NS) record, a private name server record, a start of authority (or SOA) record, a text (or TXT/SPF) record, and a service (or SRV) record). Record name field 815 indicates the name of the record, and value field 820 provides the value of the record. In addition, user interface 800 includes an add record actuator 805 to add a DNS record, a delete actuator 860 for each removable row (or record) to delete that row (or record), and an edit actuator 870 for each modifiable row (or record) to edit that row (or record).

By way of example, individual Domain Name System (DNS) records 832, 834, 836 may each be associated with a corresponding blockchain asset. For example, DNS (name server (NS)) record 832 is associated with or maps to a wallet address of a blockchain domain name (e.g., N2.E2 as viewed in FIG. 8) for performing a look-up of DNS values on a blockchain. DNS (name server (NS)) record 834 is associated with or maps to a wallet address of a blockchain domain name (e.g., N3.E3 as viewed in FIG. 8) for performing a look-up of DNS values on a blockchain. DNS (hostname pointing (CNAME alias)) record 836 is associated with or maps to a wallet address of a blockchain domain name (e.g., N4.E4 as viewed in FIG. 8) for performing a look-up of DNS values on a blockchain New Domain Name System (DNS) specific attributes may be added to the blockchain asset to indicate the values to be used for the Web2 (e.g., Internet Corporation for Assigned Names and Numbers (ICANN)). For example, a blockchain asset record may include a designated section or block (e.g., named "dns", etc.) with key/value pairs to provide values for DNS attributes. The key may specify the record type or record name with a corresponding value (e.g., key:value). An example section or block may be of the form of:

"dns":

[

"ns":"xxx1.xxxx.com.",

"ns": "xxx2.xxxx.com.",

"www": "xxxx.com"

]

DNS or other servers may perform a look-up for the DNS section or block within the blockchain asset metadata to determine values of the records. Alternatively, the blockchain asset record may point to an off-chain look-up managed through another service external of registrar software (e.g., resource server system 150, etc.). For example, the key/value pairs of the blockchain asset management record may include an address or URL for the service to perform the off-chain look-up.

Present invention embodiments may provide various technical and other advantages. For example, present invention embodiments provide enhanced security and access control for off-chain domains. By way of example, verification for granting access to domain information may use private keys of blockchains to verify the user. Moreover, domain information may be securely stored through a blockchain. In addition, present invention embodiments enable interaction between off-chain and on-chain domains, thereby providing on-chain security to the off-chain domains.

It will be appreciated that the embodiments described above and illustrated in the drawings represent only a few of the many ways of implementing embodiments for off-chain domain name record resolution based on blockchain assets. In addition, characteristics or features of embodiments of the present invention may be combined in any fashion to provide additional embodiments of the present invention.

The environment of the present invention embodiments may include any number of computer or other processing systems (e.g., client or end-user systems, server systems, blockchain systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, hand-held devices, smartphones or other mobile devices, etc.), and may include any commercially available operating system and any combination of commercially available and custom software (e.g., communications software; server software; software of present invention embodiments (including management module 116, interface module 122, authentication module 132, distributed applications (dApps) 148, data module 152, blockchain related applications 160, etc.); etc.). These systems may include any types of monitors and input devices (e.g., keyboard, mouse, voice recognition, etc.) to enter and/or view information.

It is to be understood that the software of the present invention embodiments (e.g., management module 116, interface module 122, authentication module 132, distributed applications (dApps) 148, data module 152, blockchain related applications 160, etc.) may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client, server, authentication server, blockchain, and resource server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., management module 116, interface module 122, authentication module 132, distributed applications (dApps) 148, data module 152, blockchain related applications 160, etc.) may be available on a non-transitory computer useable or readable medium (e.g., magnetic or optical mediums, magneto-optic mediums, CD-ROM, DVD, memory devices, etc.) of a stationary or portable computer program product, apparatus, or device for use with stand-alone systems or systems connected by a network or other communications medium. The computer useable or readable medium (or media) may include instructions executable by one or more processors to perform functions of present invention embodiments described herein.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., verification results, domain information, metadata associated with blockchain verifications, mappings of blockchain identities to blockchains, etc.). The database system may be implemented by any number of any conventional or other databases, data stores or storage structures to store information. The database system may be included within or coupled to the server, client, authentication server, blockchain, and/or resource server systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., results of an access request, verification results, name and/or other attributes of a blockchain asset, domain information, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., results of an access request, verification results, domain information, etc.).

The present invention embodiments are not limited to the specific tasks or algorithms described above, but may be utilized for managing domain information based on associations between off-chain and on-chain domains (e.g., between off-chain and on-chain, on-chain and on-chain, etc.).

The present invention embodiments may process requests for domain information from any entity (e.g., user, application, service, computing or other device, etc.), and utilize any blockchain asset to access any digital or other items on or off a blockchain. A blockchain asset may include any digital asset or item that identifies, is associated with, or includes objects stored on a blockchain, such as a set of records, an object that points to a set of records, non-fungible token (NFT), non-fungible token (NFT) domain names, a fungible token, a wallet address, etc. The blockchain asset may correspond to various items (e.g., blockchain or other domain name, digital art, music, video game items, non-fungible tokens (NFTs), fungible tokens, etc.). The blockchain asset may be indicated by any name or identifier including any quantity of terms, words, tokens, or arrangements of any quantity of any types of elements (e.g., alphanumeric or other characters, symbols, numbers, etc.). The name or identifier preferably includes a name or identifier portion and an optional extension (e.g., "name.e1", etc.). Alternatively, the name or identifier may include the name or identifier portion without the extension. The name and/or extension may be used for partial or exact matching for name look-ups (e.g., to obtain blockchain (or wallet) addresses and/or other attributes, etc.). The name or identifier portion and extension may each include any quantity of terms, words, tokens, or arrangements of any quantity of any types of elements (e.g., alphanumeric or other characters, symbols, numbers, etc.).

Any quantity of any domain parameters, values, or other information may be associated with a blockchain asset. The blockchain asset (or user) may be verified in any manner (e.g., signing a message, user verification, encryption/decryption, username/password, etc.). In addition, the domain records may each be associated with a corresponding blockchain asset (e.g., at least two domain records may be associated with a different blockchain asset, etc.).

The domain information may include any information arranged in any fashion (e.g., values for domain records, domain parameters, server names or addresses, etc.). The domain information may be stored on a blockchain and/or on an off-chain data source. The data source may include any storage structure (e.g., decentralized storage structure or platform, blockchain storage, database, etc.). The domain information may be stored and retrieved based on any information (e.g., based on registered user information (e.g., wallet address, blockchain asset, blockchain domain or user name, etc.). The domain information may be stored on the blockchain at any desired address (e.g., wallet or other address associated with the registered user, application, a designated user or administrator, etc.).

The blockchain assets may be from any desired blockchains, and may be from the same and/or different blockchains. The domain information from the blockchain may be verified in any manner (e.g., encrypted signature, Merkle proof, etc.).

Having described preferred embodiments of a new and improved system, method, and computer program product for off-chain domain name record resolution based on blockchain assets, it is believed that other modifications, variations and changes will be suggested to those skilled in the art in view of the teachings set forth herein. It is therefore to be understood that all such variations, modifications and changes are believed to fall within the scope of present invention embodiments as defined by the appended claims.

What is claimed is:

1. A method of managing domain information for an off-chain domain comprising:

associating, via at least one processor, the domain information for the off-chain domain with a blockchain asset by indicating the blockchain asset as a value for one or more off-chain domain records of a set of off-chain domain records for the domain information, wherein the set of off-chain domain records and corresponding values are stored off-chain and the blockchain asset stores values for the one or more off-chain domain records on a blockchain; and retrieving, via the at least one processor, the values for the domain information from the blockchain based on the blockchain asset.

2. The method of claim 1, wherein the off-chain domain includes one from a group of a Web2 domain and a Domain Name System (DNS) domain.

3. The method of claim 1, wherein the blockchain asset includes one or more from a group of a set of records on the blockchain, an object that points to a set of records on the blockchain, a non-fungible token (NFT), a non-fungible token (NFT) domain name, a fungible token, and a wallet address.

4. The method of claim 1, wherein associating the domain information further comprises:

sending a message to a blockchain address associated with the blockchain asset; and detecting signing of the message to verify the blockchain asset.

5. The method of claim 1, wherein at least two off-chain domain records are associated with a different blockchain asset each storing values for a corresponding off-chain domain record.

6. The method of claim 1, wherein the set of off-chain domain records includes Domain Name System (DNS) records.

7. The method of claim 1, wherein retrieving the values for the domain information further comprises:

receiving a request for the domain information for the off-chain domain;

accessing the set of off-chain domain records and identifying a corresponding blockchain asset associated with the one or more off-chain domain records; and retrieving information from the blockchain for the one or more off-chain domain records based on the corresponding blockchain asset to process the request.

8. A system for managing domain information for an off-chain domain comprising:

one or more memories; and at least one processor coupled to the one or more memories, the at least one processor configured to:

associate the domain information for the off-chain domain with a blockchain asset by indicating the blockchain asset as a value for one or more off-chain domain records of a set of off-chain domain records for the domain information, wherein the set of off-chain domain records and corresponding values are stored off-chain and the blockchain asset stores values for the one or more off-chain domain records on a blockchain; and retrieve the values for the domain information from the blockchain based on the blockchain asset.

9. The system of claim 8, wherein the off-chain domain includes one from a group of a Web2 domain and a Domain Name System (DNS) domain.

10. The system of claim 8, wherein the blockchain asset includes one or more from a group of a set of records on the blockchain, an object that points to a set of records on the blockchain, a non-fungible token (NFT), a non-fungible token (NFT) domain name, a fungible token, and a wallet address.

11. The system of claim 8, wherein associating the domain information further comprises:

sending a message to a blockchain address associated with the blockchain asset; and detecting signing of the message to verify the blockchain asset.

12. The system of claim 8, wherein at least two off-chain domain records are associated with a different blockchain asset each storing values for a corresponding off-chain domain record.

13. The system of claim 8, wherein the set of off-chain domain records includes Domain Name System (DNS) records.

14. The system of claim 8, wherein retrieving the values for the domain information further comprises:

receiving a request for the domain information for the off-chain domain;

accessing the set of off-chain domain records and identifying a corresponding blockchain asset associated with the one or more off-chain domain records; and retrieving information from the blockchain for the one or more off-chain domain records based on the corresponding blockchain asset to process the request.

15. A computer program product for-managing domain information for an off-chain domain, the computer program product comprising one or more non-transitory computer readable media having instructions stored thereon, the instructions executable by at least one processor to cause the at least one processor to:

associate the domain information for the off-chain domain with a blockchain asset by indicating the blockchain asset as a value for one or more off-chain domain records of a set of off-chain domain records for the domain information, wherein the set of off-chain domain records and corresponding values are stored off-chain and the blockchain asset stores values for the one or more off-chain domain records on a blockchain; and retrieve the values for the domain information from the blockchain based on the blockchain asset.

16. The computer program product of claim 15, wherein the off-chain domain includes one from a group of a Web2 domain and a Domain Name System (DNS) domain.

17. The computer program product of claim 15, wherein the blockchain asset includes one or more from a group of a set of records on the blockchain, an object that points to a set of records on the blockchain, a non-fungible token (NFT), a non-fungible token (NFT) domain name, a fungible token, and a wallet address.

18. The computer program product of claim 15, wherein associating the domain information further comprises:

sending a message to a blockchain address associated with the blockchain asset; and detecting signing of the message to verify the blockchain asset.

19. The computer program product of claim 15, wherein at least two off-chain domain records are associated with a different blockchain asset each storing values for a corresponding off-chain domain record.

20. The computer program product of claim 15, wherein the set of off-chain domain records includes Domain Name System (DNS) records.

21. The computer program product of claim 15, wherein retrieving the values for the domain information further comprises:

receiving a request for the domain information for the off-chain domain;

accessing the set of off-chain domain records and identifying a corresponding blockchain asset associated with the one or more off-chain domain records; and retrieving information from the blockchain for the one or more off-chain domain records based on the corresponding blockchain asset to process the request.

\* \* \* \* \*